United States Patent
Jeong et al.

(10) Patent No.: US 8,900,096 B2
(45) Date of Patent: Dec. 2, 2014

(54) METHOD FOR DIAGNOSING AND CONTROLLING AN UNUSUAL HYDRAULIC STATE OF HYBRID VEHICLE TRANSMISSION

(75) Inventors: Sanghyun Jeong, Hwaseong-si (KR); Jong Hyun Kim, Suwon-si (KR); Youngchul Kim, Gwangmyeong-si (KR); Jang Mi Lee, Tongyeong-si (KR); SanLok Song, Hwaseong-si (KR); Seungjae Kang, Hwaseong-si (KR); Jaeshin Yi, Suwon-si (KR); Haksung Lee, Gunpo-si (KR); Seung Ki Kong, Hwaseong-si (KR)

(73) Assignee: Hyundai Motor Company, Seoul (KR)

( * ) Notice: Subject to any disclaimer, the term of this patent is extended or adjusted under 35 U.S.C. 154(b) by 235 days.

(21) Appl. No.: 13/547,864

(22) Filed: Jul. 12, 2012

(65) Prior Publication Data

US 2013/0150209 A1    Jun. 13, 2013

(30) Foreign Application Priority Data

Dec. 9, 2011    (KR) .......................... 10-2011-0132264

(51) Int. Cl.
*B60W 10/00*    (2006.01)
(52) U.S. Cl.
USPC .......................................................... 477/80
(58) Field of Classification Search
USPC ........... 477/3–9, 15, 70, 79, 80, 86, 166, 168, 477/174, 906, 907; 903/945, 946; 701/62, 701/63
See application file for complete search history.

(56) References Cited

U.S. PATENT DOCUMENTS

| | | | | |
|---|---|---|---|---|
| 5,842,144 A | * | 11/1998 | Coutant et al. | 701/62 |
| 7,222,005 B2 | * | 5/2007 | Kang et al. | 701/31.5 |
| 7,648,440 B2 | * | 1/2010 | Wu et al. | 477/180 |
| 8,357,074 B2 | * | 1/2013 | Wu et al. | 477/5 |
| 2007/0173373 A1 | * | 7/2007 | Kinugasa et al. | 477/3 |
| 2008/0176709 A1 | * | 7/2008 | Wu et al. | 477/143 |

FOREIGN PATENT DOCUMENTS

| | | |
|---|---|---|
| JP | 2004-125104 A | 4/2004 |
| JP | 2006-17239 A | 1/2006 |
| JP | 2007-46621 A | 2/2007 |
| JP | 2009-156396 A | 7/2009 |
| JP | 2010-078023 A | 4/2010 |
| KR | 10-2002-0041921 A | 6/2002 |
| KR | 10-2009-0047706 A | 5/2009 |
| KR | 10-2010-0106059 A | 10/2010 |

* cited by examiner

*Primary Examiner* — Justin Holmes
(74) *Attorney, Agent, or Firm* — Morgan, Lewis & Bockius LLP

(57) ABSTRACT

A system and method for diagnosing and controlling an unusual hydraulic state of an electric variable transmission of a hybrid vehicle achieving multi modes including a first mode and a second mode, the method may include determining whether the first mode is converted into the second mode, determining whether a hydraulic pressure is generated in a clutch which is engaged and the generated hydraulic pressure is higher than a predetermined hydraulic pressure when the first mode is converted into the second mode, and determining that the hybrid vehicle is in an unusual condition if the hydraulic pressure is not generated in the clutch or the generated hydraulic pressure is higher than the predetermined hydraulic pressure.

8 Claims, 5 Drawing Sheets

METHOD FOR DIAGNOSING AND CONTROLLING AN UNUSUAL HYDRAULIC STATE OF HYBRID VEHICLE TRANSMISSION

CROSS-REFERENCE TO RELATED APPLICATION

The present application claims priority of Korean Patent Application Number 10-2011-0132264 filed Dec. 9, 2011, the entire contents of which application is incorporated herein for all purposes by this reference.

BACKGROUND OF INVENTION

1. Field of Invention

The present invention relates to a method for diagnosing and controlling an unusual hydraulic state of hybrid vehicle transmission. More particularly, the present invention relates to a method for diagnosing and controlling an unusual hydraulic state of hybrid vehicle transmission which may determine the unusual hydraulic state of hybrid vehicle transmission when a contamination problem occurs in the transmission and eliminate foreign substances quickly.

2. Description of Related Art

A vehicle having a hybrid transmission which is composed of an engine, a motor-generator, and a planetary gear generally drives by an electric vehicle mode in starting and low speed section. After that, when the vehicle gains speed, the vehicle drives in a power distribution mode in which uses the power of the engine and the motor-generator more effectively by applying electrically variable transmission (EVT). Further the vehicle may use a fixed gear ratio for improving power performance of the vehicle. A system based on the above mentioned concepts has been developed for improving power performance, fuel-efficiency of vehicle, idle stop, and regeneration braking.

However, a shifting shock and an unusual shifting phenomenon can be happened when a hydraulic problem occurs in the transmission of hybrid vehicle just like a transmission of gasoline vehicle. There was no special method for diagnosis and countermeasure when these problems happen since the hydraulic pressure is impossible to measure in a real time.

The conventional art was trying to solve the problem by testing the performance of hydraulic pressure of transmission assembly, reproducing the problem, disassembling the transmission assembly, and analyzing. Therefore, the conventional art may bring serious danger to the user since the conventional art cannot quickly diagnose and solve the hydraulic problem of the hybrid vehicle transmission.

The information disclosed in this Background section is only for enhancement of understanding of the general background of the invention and should not be taken as an acknowledgement or any form of suggestion that this information forms the prior art already known to a person skilled in the art.

SUMMARY OF INVENTION

Various aspects of the present invention provide for a method for diagnosing and controlling an unusual hydraulic state of an electric variable transmission of a hybrid vehicle having advantages of improving safety of the vehicle user by quickly and accurately determining an unusual hydraulic state of an electric variable transmission of a hybrid vehicle, and guiding the vehicle user to treat the problem.

Various aspects of the present invention provide for a method for diagnosing and controlling an unusual hydraulic state of an electric variable transmission of a hybrid vehicle achieving multi modes including a first mode and a second mode, the method may include determining whether the first mode is converted into the second mode, determining whether a hydraulic pressure is generated in a clutch which is engaged and the generated hydraulic pressure is higher than a predetermined hydraulic pressure when the first mode is converted into the second mode, and determining that the hybrid vehicle is in an unusual condition if the hydraulic pressure is not generated in the clutch or the generated hydraulic pressure is higher than the predetermined hydraulic pressure.

The hydraulic pressure may be determined not to be generated in the clutch when a second ring gear speed ($\omega_{R2}$) at the second mode is a negative value, and a rate of change (a slope) of a second motor-generator speed ($\omega_{MG2}$) at the second mode is a positive value.

The hydraulic pressure may be determined to be higher than the predetermined hydraulic pressure when a rate of change (a slope) of a second motor-generator speed ($\omega_{MG2}$) at the second mode is larger than a maximum value ($A_{criteria\_max}$) predetermined normal range, or the rate of change (the slope) of the second motor-generator speed ($\omega_{MG2}$) at the second mode is smaller than a minimum value ($B_{criteria\_min}$) of the predetermined normal range.

The method may further include forcibly driving a control solenoid valve when the hybrid vehicle is determined to be in the unusual condition.

The method may further include redetermining whether the hybrid vehicle is in the unusual condition if the hybrid vehicle runs after forcibly driving the control solenoid valve.

The method may further include maintaining the mode of the electric variable transmission to be the first mode when the vehicle is determined to be unusual state at the redetermining step.

A method for diagnosing and controlling an unusual hydraulic state of an electric variable transmission of a hybrid vehicle according to various aspects of the present invention may improve safety of a vehicle user by quickly and accurately determining the unusual hydraulic state of the electric variable transmission, and eliminating foreign substances.

The methods and apparatuses of the present invention have other features and advantages which will be apparent from or are set forth in more detail in the accompanying drawings, which are incorporated herein, and the following Detailed Description, which together serve to explain certain principles of the present invention.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Figure 1:
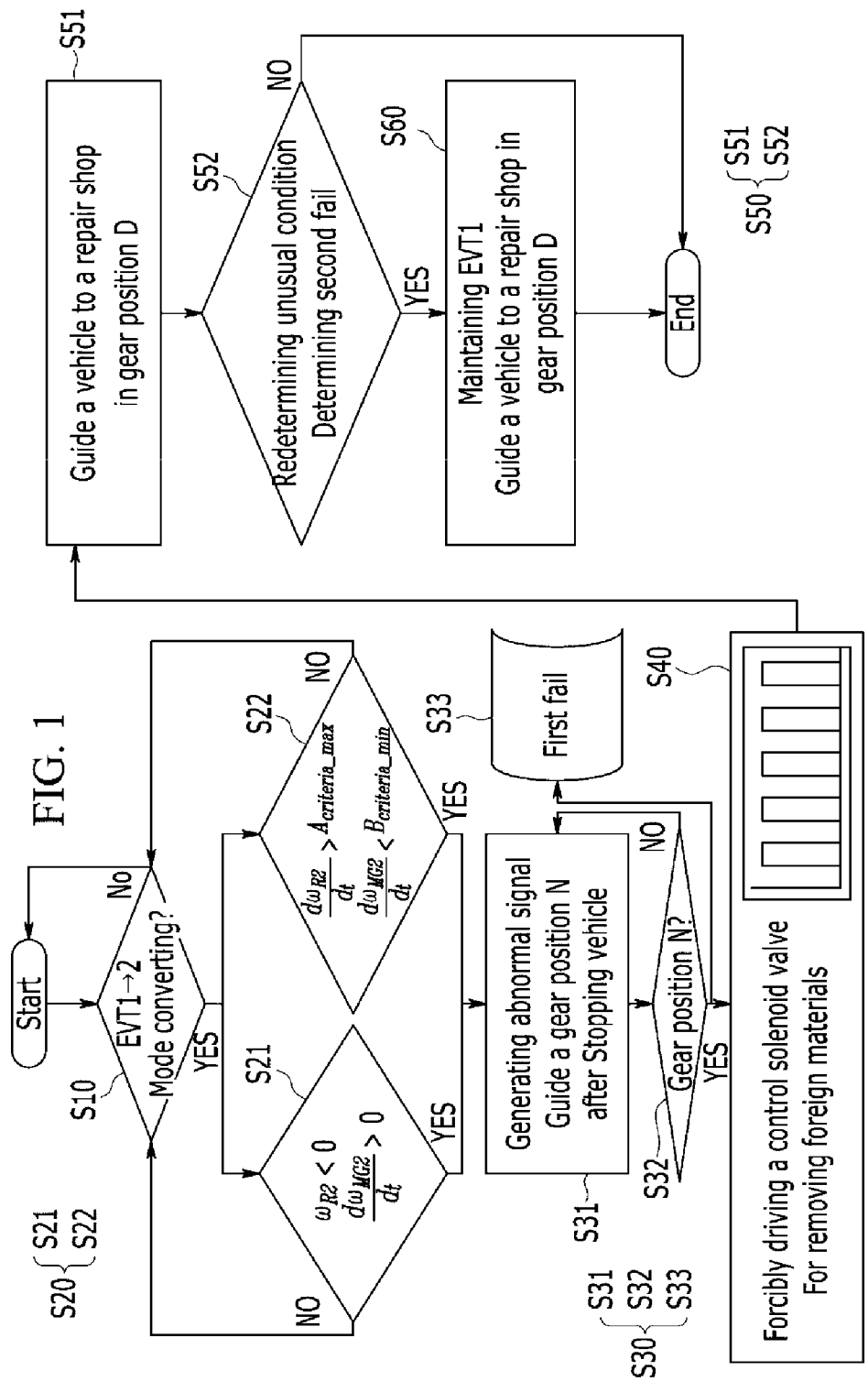
FIG. 1 is a flowchart of an exemplary method for diagnosing and controlling an unusual hydraulic state of an electric variable transmission of a hybrid vehicle according to the present invention.
Figure 2:
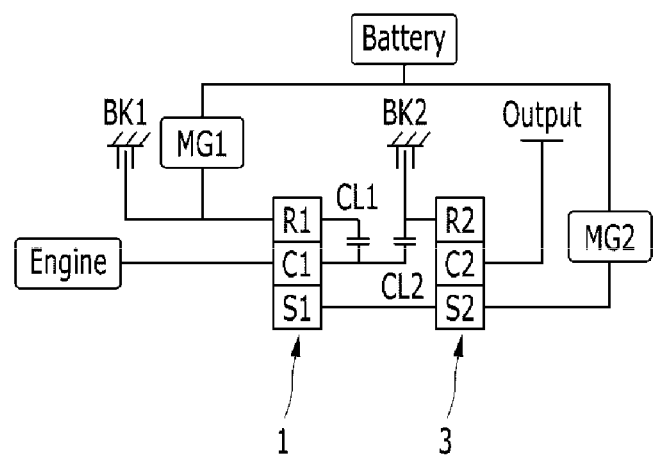
FIG. 2 is a schematic diagram of an exemplary hybrid vehicle according to the present invention.

FIG. 1 is a flowchart of a method for diagnosing and controlling an unusual hydraulic state of an electric variable transmission of a hybrid vehicle according to various embodiments of the present invention, and FIG. 2 is a schematic diagram of a hybrid vehicle according to various embodiments of the present invention.

As shown in FIG. 1 and FIG. 2, a method for diagnosing and controlling an unusual hydraulic state of an electric variable transmission of a hybrid vehicle achieving multi modes including a first mode and a second mode, the method according to various embodiments of the present invention may include a step S10 for determining whether the first mode is converted into the second mode, a step S20 for determining whether a hydraulic pressure is generated in a clutch which is engaged and the generated hydraulic pressure is higher than a predetermined hydraulic pressure when the first mode is converted into the second mode, a step S30 for determining that the hybrid vehicle is in an unusual condition if the hydraulic pressure is not generated in the clutch or the generated hydraulic pressure is higher than the predetermined hydraulic pressure, a step S40 for forcibly driving a control solenoid valve when the hybrid vehicle is determined to be in the unusual condition, a step S50 for redetermining whether the hybrid vehicle is in the unusual condition if the hybrid vehicle runs after forcibly driving the control solenoid valve, and a step S60 for maintaining the mode of the electric variable transmission to be the first mode when the vehicle is determined to be unusual state at the redetermining step.

At step S10, a control portion of the hybrid vehicle determines whether the first mode of is converted into the second mode in the transmission of the hybrid vehicle.

The transmission of the hybrid vehicle according to various embodiments of the present invention may be a multi mode electric variable transmission having the first mode (EVT1) and the second mode (EVT2)

As shown in FIG. 2, a first motor generator MG1 and a second motor generator MG2, and a first differential gear 1 and a second differential gear 3 respectively connected to the first and the second motor generator MG1 and MG2 may be included to the hybrid vehicle according to various embodiments Each of the first and the second differential gear 1 and 3 may be configured to a planetary gear set. The first differential gear 1 may be configured to a first sun gear S1, a first carrier C1, and a first ring gear R1. The second differential gear 2 may be configured to a second sun gear S2, a second carrier C2, and a second ring gear R2.

The first and the second differential gear 1 and 3 may be configured to not only the planetary gear set, but other gear set in which at least one gear has an weighted average speed of another two gears, such as bevel gear.

In various embodiments, as shown in FIG. 2, the first sun gear S1 is always connected to the second sun gear S2, and the first carrier C1 is connected to the second ring gear R2 through the second clutch CL2, and is connected to the engine (ENGINE) directly. The first ring gear R1 is always connected to the first motor-generator MG1, and the second sun gear S2 is always connected to the second motor-generator MG, and the second carrier C2 is connected to the output element (Output). The second brake BK2 is provided to stop the rotation of the second ring gear R2.

Meanwhile, the first clutch CL1 is selectively connected to the first carrier C1 and the first ring gear R1, and the first brake BK1 is provided to stop the rotation of the first ring gear R1.

As shown in FIG. 2, the second brake BK2 is released and the second clutch CL2 is engaged when the mode of the electric variable transmission of the hybrid vehicle is converted from the first mode EVT1 to the second mode EVT2.

Figure 3:
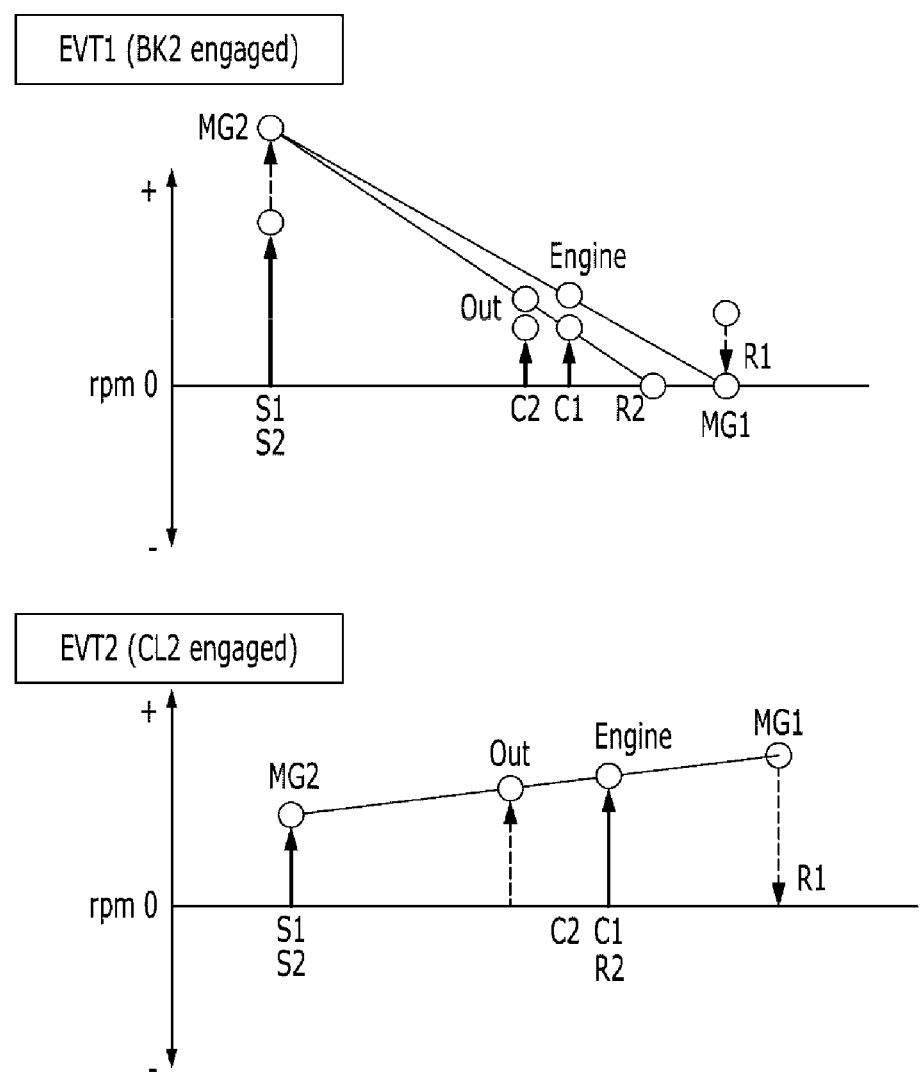
FIG. 3 is a schematic diagram for showing an exemplary speed of each part in the first mode and the second mode.
Figure 4:
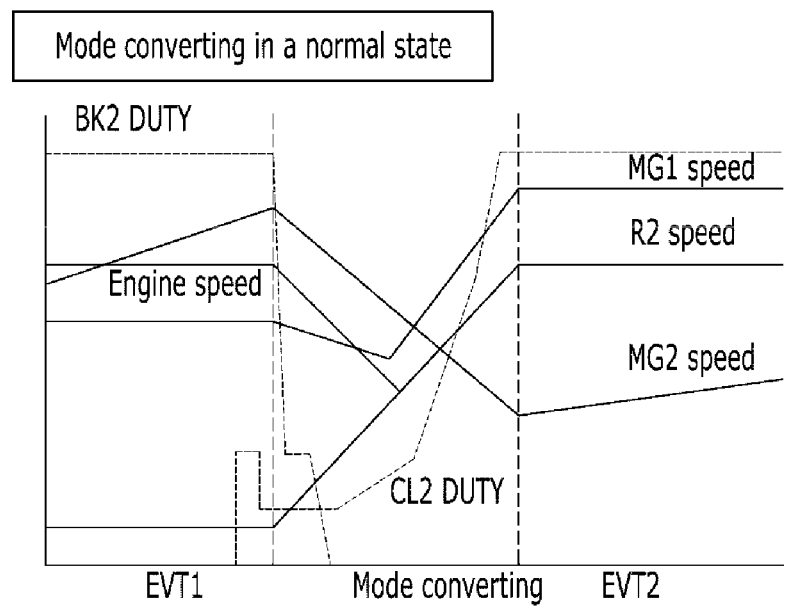
FIG. 4 is a schematic diagram for showing an exemplary change of speed of each part of the hybrid vehicle in a normal state.

FIG. 3 is a schematic diagram for showing a speed of each part in the first mode and the second mode, and FIG. 4 is a schematic diagram for showing a change of speed of each part of the hybrid vehicle in a normal state.

As shown in FIG. 3 and FIG. 4, the second ring gear R2 is released from the second brake BK2 and engaged with the second clutch CL2, as a result the second ring gear R2 is connected to the engine (ENGINE), and the speed of the second ring gear R2 is synchronized to the engine speed. And, as shown in FIG. 4, the speed of the second motor-generator MG2 slowly goes down when the first mode EVT1 is converted into the second mode EVT2.

However, if a problem happens to the hydraulic state of an electric variable transmission by foreign substances, a change of speed of each part is different from the change of speed of each part in the normal state shown in FIG. 4 when the first mode (EVT1) is converted into the second mode (EVT2) so that unusual hydraulic state can be determined by comparing with the normal state.

At step S20, the control portion of the present invention determines whether a hydraulic pressure is generated in the second clutch CL2 and the generated hydraulic pressure is higher than a predetermined hydraulic pressure when the first mode (EVT1) is converted into the second mode (EVT2).

The case of the unusual hydraulic state produced by the foreign substances may be divided into two cases such as a case that the hydraulic pressure is not generated at step S21 and a case that the generated hydraulic pressure is higher than the predetermined hydraulic pressure at step S22.

The second brake BK2 is released and the speed of the second ring gear R2 is synchronized to the engine speed by engaging of the second clutch CL2 in the normal state when the first mode (EVT1) is converted into the second mode (EVT2). However, as shown in FIG. 5, If the hydraulic pressure is not generated at step S21 when the first mode (EVT1) is converted into the second mode (EVT2), the second clutch CL2 cannot have a hydraulic pressure for engaging, as a result the entire lever of the planetary gear set rotates in the opposite direction of those in the normal state, the speed of the second motor-generator MG2 is rapidly rising, and the speed of the second ring gear R2 has a negative value by rotating in the opposite direction.

Figure 5:
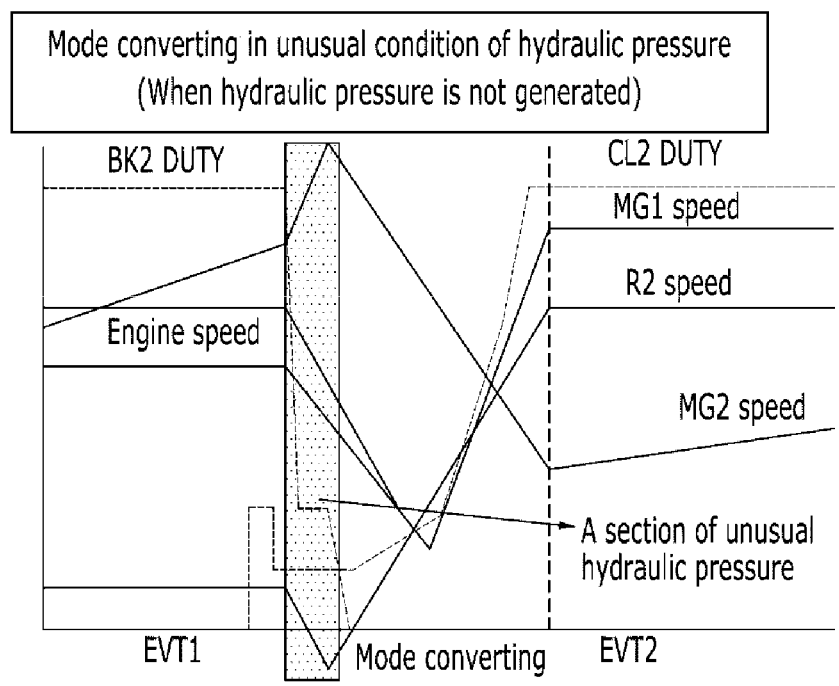
FIG. 5 is a schematic diagram for showing an exemplary change of speed of each part of the hybrid vehicle when hydraulic pressure is not generated.

After that, as shown in FIG. 5, a hydraulic pressure is suddenly produced at the second clutch CL2 as a result the speed of the second motor-generator MG2 decreases, and the speed of the second ring gear R2 is synchronized to the engine speed therefore a shifting shock occurs to the vehicle.

In various embodiments, the case that the hydraulic pressure is not generated at step S21 can be expressed in an equation 1

Unlike gasoline vehicle, the multi mode transmission of the hybrid vehicle generally detects the speed of the second motor-generator MG2 so that the speed of the second ring gear R2 can be calculated by using the equation 1.

$$\omega_{R2} = \frac{Z_{R2} + Z_{S2}}{Z_{R2}} \omega_{out} - \frac{Z_{S2}}{Z_{R2}} \omega_{MG2} < 0 \quad \text{(Equation 1)}$$

$$\frac{d\omega_{MG2}}{dt} > 0$$

In the equation 1, the $\omega_{R2}$ refers to the speed of the second ring gear R2 shown in FIG. 2, the $\omega_{out}$ refers to the speed of the output elements (Output), the $\omega_{MG2}$ refers to the speed of the second motor-generator MG2, the $Z_{R2}$ refers to the radius or the number of teeth of the second ring gear, $Z_{S2}$ refers to the radius or the number of teeth of the second sun gear.

According to the equation 1, the hydraulic pressure is determined not to be generated in the second clutch CL2 when the speed ($\omega_{R2}$) of the second ring gear R2 is a negative value, and a rate of change (a slope) of the speed ($\omega_{MG2}$) of the second motor-generator MG2 is a positive value.

On the other hand, if the generated hydraulic pressure at the second clutch CL2 is higher than the predetermined hydraulic pressure at step S22, when the first mode EVT1 is converted to the second mode EVT2, shifting shock can be occurred since the speed of the motor generator MG2 is rapidly down and the speed of the second ring gear R2 is rapidly increase in comparison with those of the normal state shown in FIG. 3.

In various embodiments, the case that the generated hydraulic pressure at the second clutch CL2 is higher than the predetermined hydraulic at step S22 can be expressed in an equation 2.

$$\frac{d\omega_{R2}}{dt} > A_{criteria\_max} \quad \text{(Equation 2)}$$

$$\frac{d\omega_{MG2}}{dt} < B_{criteria\_min}$$

In the equation 2, the $\omega_{R2}$ refers to the speed of the second ring gear R2 shown in FIG. 2, the $\omega_{MG2}$ refers to the speed of the second motor-generator MG2, the $A_{criteria\_max}$ refers to a maximum value of a predetermined normal range, and the $B_{criteria\_min}$ refers to a minimum value of the predetermined normal range.

The $A_{criteria\_max}$ and the $B_{criteria\_min}$ may be determined by experiment.

According to the equation 2, the hydraulic pressure is determined to be higher than the predetermined hydraulic pressure when the rate of change (a slope) of the second motor-generator the speed ($\omega_{MG2}$) is larger than the maximum value ($A_{criteria\_max}$) of the predetermined normal range, or the rate of change (the slope) of the second motor-generator speed ($\omega_{MG2}$) at the second mode is smaller than a minimum value ($B_{criteria\_min}$) of the predetermined normal range.

If the hydraulic pressure is determined not to be generated at step S21 or to be higher than the predetermined hydraulic pressure at step S22, the control portion of the vehicle determines the hybrid vehicle to be unusual condition at step S30, transmits a signal to the vehicle user at step S31, and guides the transmission lever to the normal position (N) after stopping the vehicle at step S32.

In various embodiments, the control solenoid valve may be forcibly driven by duty 0 to 100% several times so as to eliminate the foreign substances when the hybrid vehicle is determined to be in the unusual condition and the transmission lever is in the normal position (N) at step 40.

The number and the interval of driving of the control solenoid valve may be determined by experiment.

At step S50, the control portion of the vehicle redetermines whether the hybrid vehicle is in the unusual condition if the hybrid vehicle runs after forcibly driving the control solenoid valve. At step S51, the control portion of the vehicle may guide a position of repair shop and induces the position of transmission lever to be drive position (D) since the foreign substances may not be completely eliminated by the forcible driving of the control solenoid valve. At step S52, the control portion of the vehicle may redetermine whether the hybrid vehicle is in the unusual condition while guiding the vehicle.

At step S60, the control portion of the vehicle maintains the mode of the electric variable transmission to be the first mode (EVT1), guide a position of repair shop, and induces the position of transmission lever to be drive position when the vehicle is determined to be unusual state at the redetermining step.

For convenience in explanation and accurate definition in the appended claims, the terms upper or lower, front or rear, inside or outside, and etc. are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A method for diagnosing and controlling an unusual hydraulic state of an electric variable transmission of a hybrid vehicle achieving multi modes including a first mode and a second mode, the method comprising:
   determining whether the first mode is converted into the second mode;
   determining whether a hydraulic pressure is generated in a clutch which is engaged and the generated hydraulic pressure is higher than a predetermined hydraulic pressure when the first mode is converted into the second mode; and
   determining that the hybrid vehicle is in an unusual condition if the hydraulic pressure is not generated in the clutch or the generated hydraulic pressure is higher than the predetermined hydraulic pressure;
   wherein the hydraulic pressure is determined not to be generated in the clutch when a second ring gear speed ($\omega_{R2}$) at the second mode is a negative value, and a rate of change (a slope) of a second motor-generator speed ($\omega_{MG2}$) at the second mode is a positive value.

2. The method of claim 1, further comprising forcibly driving a control solenoid valve when the hybrid vehicle is determined to be in the unusual condition.

3. The method of claim 2, further comprising redetermining whether the hybrid vehicle is in the unusual condition if the hybrid vehicle runs after forcibly driving the control solenoid valve.

4. The method of claim 3, further comprising maintaining the mode of the electric variable transmission to be the first mode when the vehicle is determined to be unusual state at the redetermining step.

5. A method for diagnosing and controlling an unusual hydraulic state of an electric variable transmission of a hybrid vehicle achieving multi modes including a first mode and a second mode, the method comprising:

determining whether the first mode is converted into the second mode;

determining whether a hydraulic pressure is generated in a clutch which is engaged and the generated hydraulic pressure is higher than a predetermined hydraulic pressure when the first mode is converted into the second mode; and determining that the hybrid vehicle is in an unusual condition if the hydraulic pressure is not generated in the clutch or the generated hydraulic pressure is higher than the predetermined hydraulic pressure;

wherein the hydraulic pressure is determined to be higher than the predetermined hydraulic pressure when a rate of change (a slope) of a second motor-generator speed ($\omega_{MG2}$) at the second mode is larger than a maximum value ($A_{criteria\_max}$) of a predetermined normal range, or the rate of change (the slope) of the second motor-generator speed ($\omega_{MG2}$) at the second mode is smaller than a minimum value ($B_{criteria\_min}$) of the predetermined normal range.

6. The method of claim 5, further comprising forcibly driving a control solenoid valve when the hybrid vehicle is determined to be in the unusual condition.

7. The method of claim 6, further comprising redetermining whether the hybrid vehicle is in the unusual condition if the hybrid vehicle runs after forcibly driving the control solenoid valve.

8. The method of claim 7, further comprising maintaining the mode of the electric variable transmission to be the first mode when the vehicle is determined to be unusual state at the redetermining step.

* * * * *